(12) United States Patent
Singh et al.

(10) Patent No.: US 10,177,404 B2
(45) Date of Patent: Jan. 8, 2019

(54) ACTIVE MATERIAL FOR RECHARGEABLE BATTERY

(71) Applicant: Toyota Motor Engineering & Manufacturing North America, Inc., Erlanger, KY (US)

(72) Inventors: Nikhilendra Singh, Ypsilanti, MI (US); Timothy Sean Arthur, Ann Arbor, MI (US); Chen Ling, Ann Arbor, MI (US); Masaki Matsui, Tsu (JP); Fuminori Mizuno, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 122 days.

(21) Appl. No.: 13/679,616

(22) Filed: Nov. 16, 2012

(65) Prior Publication Data

US 2013/0266851 A1   Oct. 10, 2013

Related U.S. Application Data

(60) Provisional application No. 61/620,612, filed on Apr. 5, 2012, provisional application No. 61/660,025, filed on Jun. 15, 2012.

(51) Int. Cl.
| | |
|---|---|
| *H01M 10/054* | (2010.01) |
| *H01M 10/0564* | (2010.01) |
| *H01M 4/38* | (2006.01) |
| *H01M 4/134* | (2010.01) |

(52) U.S. Cl.
CPC ......... *H01M 10/054* (2013.01); *H01M 4/387* (2013.01); *H01M 10/0564* (2013.01); *H01M 4/134* (2013.01)

(58) Field of Classification Search
CPC . H01M 10/054; H01M 10/0564; H01M 4/387
See application file for complete search history.

(56) References Cited

U.S. PATENT DOCUMENTS

| | | |
|---|---|---|
| 2004/0029012 A1 | 2/2004 | Tanizaki et al. |
| 2004/0137324 A1 | 7/2004 | Itaya et al. |
| 2006/0222955 A1 | 10/2006 | Ogawa et al. |
| 2008/0226983 A1* | 9/2008 | Odani et al. ............... 429/200 |
| 2009/0197168 A1 | 8/2009 | Nishida et al. |

(Continued)

FOREIGN PATENT DOCUMENTS

| | | |
|---|---|---|
| JP | 2000-212676 A | 8/2000 |
| JP | 2003512704 A | 4/2003 |

(Continued)

OTHER PUBLICATIONS

Vasant el al., High Energy Density Lithium battery: Materials, Engineering, Applications, Chap1. Introduction to Electrochemical Cells, Published Apr. 2010, p. 4.*

(Continued)

*Primary Examiner* — Carlos Barcena
(74) *Attorney, Agent, or Firm* — Dinsmore & Shohl LLP

(57) ABSTRACT

A magnesium-ion battery includes a first electrode including an active material and a second electrode. An electrolyte is disposed between the first electrode and the second electrode. The electrolyte includes a magnesium compound. The active material includes tin.

14 Claims, 7 Drawing Sheets

(56) References Cited

U.S. PATENT DOCUMENTS

| | | |
|---|---|---|
| 2009/0311608 A1 | 12/2009 | Hirose et al. |
| 2010/0012406 A1 | 1/2010 | Kressner et al. |
| 2010/0216027 A1* | 8/2010 | Fujii ............................ 429/246 |
| 2011/0111286 A1* | 5/2011 | Yamamoto et al. .......... 429/188 |
| 2011/0244338 A1 | 10/2011 | Muldoon et al. |
| 2013/0260225 A1* | 10/2013 | Doe ..................... H01M 4/381 |
| | | 429/188 |

FOREIGN PATENT DOCUMENTS

| | | | |
|---|---|---|---|
| JP | 2004265677 A | | 9/2004 |
| JP | 2004-327078 A | | 11/2004 |
| JP | 2006107796 A | | 4/2006 |
| JP | 2006294374 A | | 10/2006 |
| JP | pct/jp2009/060234 | * 12/2009 | ............ H01M 10/20 |
| JP | 2011-249175 A | | 12/2011 |
| WO | 0129919 A1 | | 4/2001 |
| WO | 2007052742 A1 | | 5/2007 |

OTHER PUBLICATIONS

Lancry et al., "The effect of milling on the performance of a $Mo_6S_8$ Chevrel phase as a cathode material for rechargeable Mg batteries", Published online: Feb. 24, 2005.*

* cited by examiner

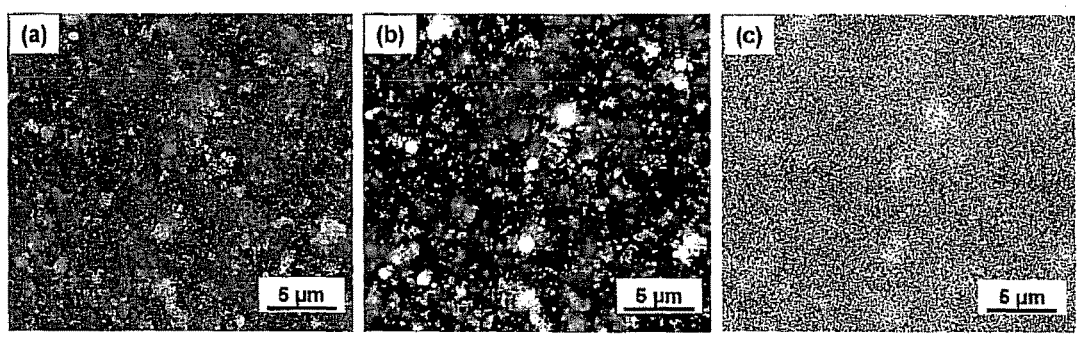
Fig. 6 (a) Secondary electron image, (b) backscatter electron image, and (c) EDX map captured of the as-fabricated Sn film.

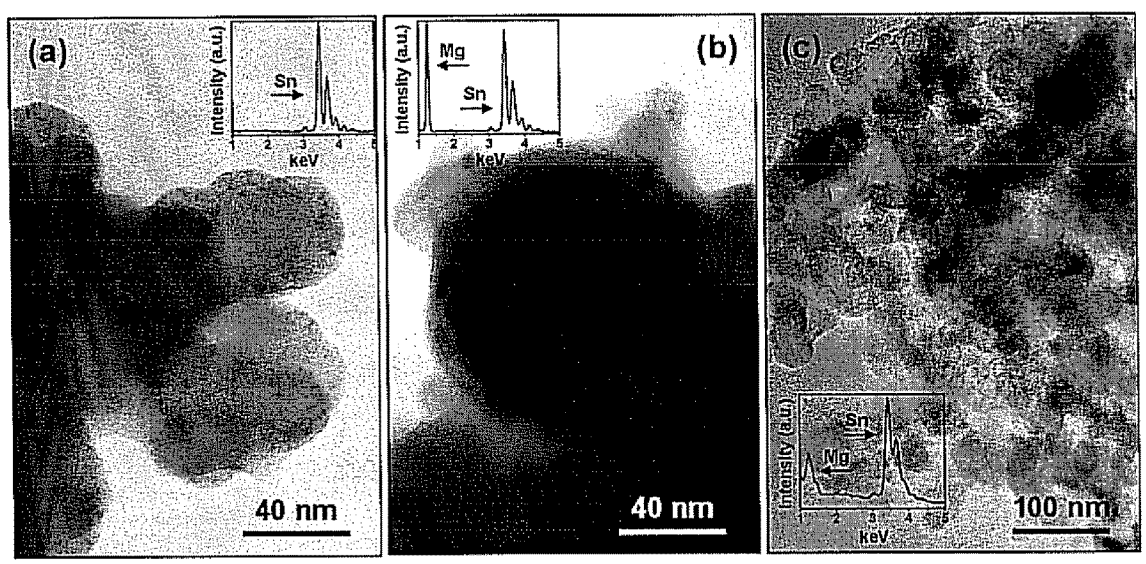
Fig. 7 TEM images and TEM-EDX spectrum profiles for (a) as-fabricated Sn, (b) magnesiated Sn and (c) de-magnesiated $Mg_2Sn$ films.

ACTIVE MATERIAL FOR RECHARGEABLE BATTERY

REFERENCE TO RELATED APPLICATIONS

This application claims priority of U.S. Provisional Patent Application Ser. No. 61/620,612, filed Apr. 5, 2012, and U.S. Provisional Patent Application Ser. No. 61/660,025, filed Jun. 15, 2012, the entire contents of which are incorporated herein by reference.

FIELD OF THE INVENTION

The invention relates to electrochemical devices such as batteries, in particular rechargeable batteries, such as rechargeable magnesium and magnesium-ion batteries.

BACKGROUND OF THE INVENTION

Rechargeable batteries, such as lithium-ion batteries, have numerous commercial applications. Volumetric energy density is an important characteristic, and higher volumetric energy densities are desirable for a variety of applications.

A magnesium ion in a magnesium or magnesium-ion battery carries two electrical charges, in contrast to the single charge of a lithium ion. Improved electrode materials would be very useful in order to develop high energy density batteries.

SUMMARY OF THE INVENTION

In one aspect there is disclosed a magnesium battery that includes a first electrode including an active material and a second electrode. An electrolyte is disposed between the first electrode and the second electrode. The electrolyte includes a magnesium compound. The active material includes tin.

In a further aspect, there is disclosed a magnesium-ion battery that includes a first electrode including an active material and a second electrode. An electrolyte is disposed between the first electrode and the second electrode. The electrolyte includes a magnesium compound. The active material includes tin.

In another aspect, there is disclosed a magnesium-ion battery that includes a first electrode including an active material and a second electrode. A conventional electrolyte such as magnesium bis(trifluoromethanesulfonyl)imide in 1,2-Dimethoxyethane (DME) electrolyte is disposed between the first electrode and the second electrode. The electrolyte includes a magnesium compound. The active material includes tin.

BRIEF DESCRIPTION OF THE FIGURES

FIG. 6 is (a) secondary electron image, (b) backscatter electron image, and (c) EDX map captured of the as-fabricated Sn film;

FIG. 7 is TEM images and TEM-EDX spectrum profiles for (a) as-fabricated Sn, (b) magnesiated Sn and (c) de-magnesiated $Mg_2Sn$ films.

DETAILED DESCRIPTION OF THE INVENTION

Examples of the present invention include electrochemical devices, such as batteries, in particular rechargeable batteries. Examples include magnesium-based batteries, and specifically to materials used as active materials within the electrodes of a magnesium battery. In particular, an example battery includes an electrode active material that includes tin. The improved active materials described herein may be used within the cathode and/or anode of an example battery.

A rechargeable magnesium battery is expected to be a high energy density system. In particular, as compared to lithium-ion batteries, the magnesium ion transfers two electrons per magnesium ion. However, previously there have been a lack of good cathode or anode active materials which can fully utilize the advantage of the high energy density.

Figure 2:
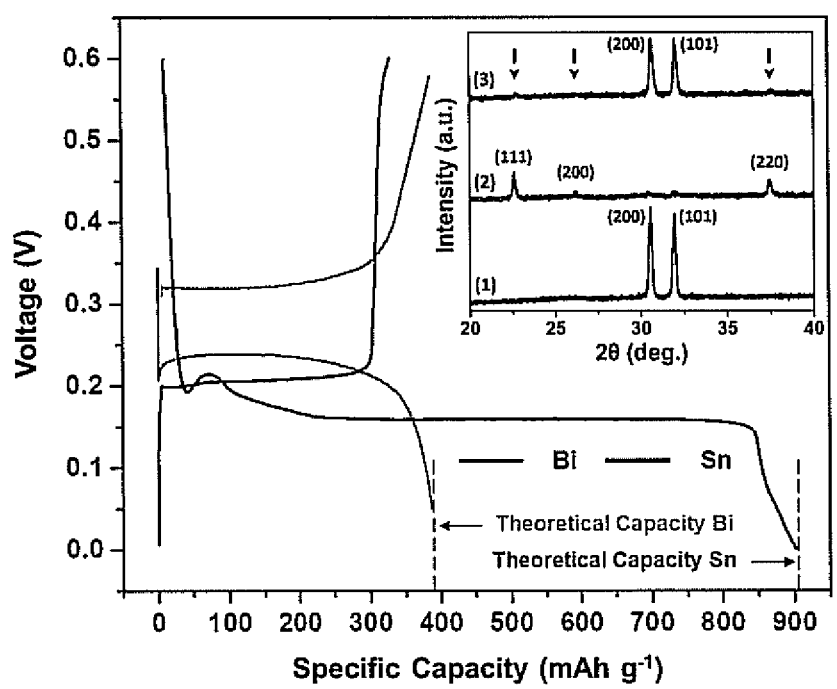
FIG. 2 is a diagram of $1^{st}$ cycle galvanostatic magnesiation/de-magnesiation curves for Sn/Mg (black) and Bi/Mg (red) half-cells (using organohaloaluminate electrolyte) highlighting their achievable theoretical capacities. Inset—XRD spectra for (1) as-fabricated Sn, (2) magnesiated Sn (or $Mg_2Sn$—peak positions marked with arrows) and (3) de-magnesiated $Mg_2Sn$.

FIG. 2 shows the $1^{st}$ cycle galvanostatic half-cell (Anode/Mg) magnesiation/de-magnesiation curves for a Sn and a Bi anode at a 0.002 C-rate. This experiment was executed in an organohaloaluminate electrolyte to test the feasibility of using an insertion-type Sn anode in Mg-ion batteries. The magnesiation (defined as insertion of $Mg^{2+}$) plateau observed at +0.15 V corresponds to the formation of $Mg_2Sn$ according to binary phase diagrams, and the reaction (1):

$$Sn + 2Mg^{2+} + 4e^- \rightarrow Mg_2Sn \quad (1)$$

In examples of the present invention, improved active materials including tin are used as the active material for a rechargeable battery. The active material may further include an electrically conductive material and a binder. Examples of electrically conducting materials include carbon particles, such as carbon black. Example binders include various polymers, such as PVdF, PTFE, SBR, or Polylmide.

The electrolyte layer may include a conventional electrolyte such as ($TFSI^-$, $ClO_4^-$, and $PF_6^-$). The electrolyte layer may include a separator which helps maintain electrical isolation between the positive and negative electrodes. A separator may include fibers, particles, web, porous sheet, or other forms of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some cases, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example, including a plasticized polymer, and may have a polymer infused with or otherwise including magnesium ions. In some examples, an electrolyte may include a molten salt.

In the example of a battery including an electrode having a cathode active material, it may be present as a sheet, ribbon, particles, or other physical form. Cathode active materials may include materials that show an electrochemical reaction at a higher electrode potential than the first electrode or anode. An example of one cathode active material is a transition metal oxide or sulfide. An electrode containing the cathode active material may be supported by a current collector.

A current collector may include a metal or other electrically conducting sheet on which the electrode is supported. A metal sheet may include aluminum, copper, or other metal or alloy. In some examples, a metal housing may provide the function of a current collector. Other conducting materials, such as electrically conducting polymers, may be used as the current collector.

A binder used in an electrode may include any material capable of binding the electrode components. Many binders are known in the battery arts, for example, various polymer binders are known and can be used.

Figure 1:
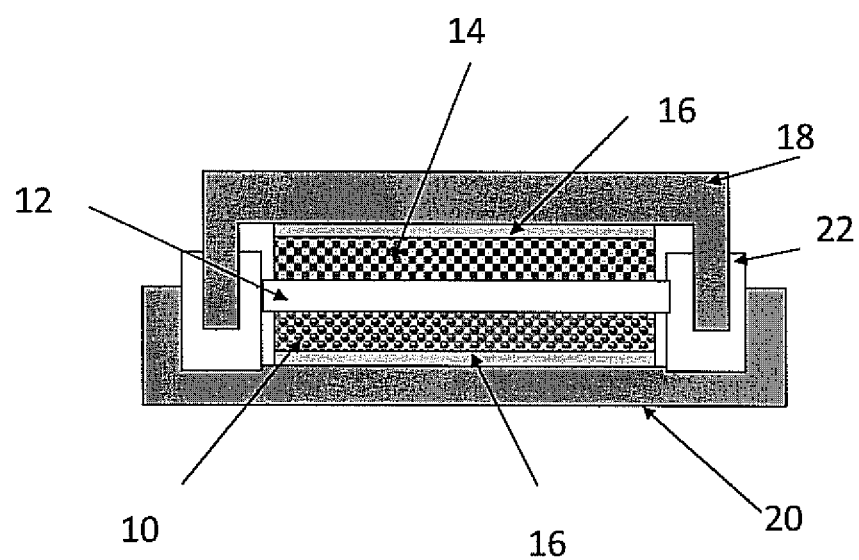
FIG. 1 is a diagram of a magnesium or magnesium-ion battery having a positive electrode containing a cathode active material and a negative electrode including a novel active material.

FIG. 1 shows a rechargeable magnesium-ion battery having an improved negative electrode active material. The battery includes a positive electrode 10 including a cathode active material, an electrolyte layer 12, a negative electrode 14, current collector 16, negative electrode housing 18, positive electrode housing 20, and sealing gasket 22. The electrolyte layer 12 includes a separator soaked in electrolyte solution, and the positive electrode 10 is supported by the current collector 16. In this example, the negative electrode 14 includes an improved active material according to an example of the present invention, conductive carbon, and a binder. For example, the negative electrode 14 may include tin.

EXAMPLES

Fabrication of Sn Electrodes:

Sn electrodes were fabricated via a traditional pressed powder film method. Sn nanopowder (<150 nm particle size) was purchased from Sigma Aldrich and used as-received. Carbon black (EC600-JD) was purchased from Ketjen Black International Inc. and used as received. Polyvinylidene fluoride (KF 1120 polymer-12 wt. % PVDF) was the binding agent for the powder films and was purchased from Kureha and also used as-received. Sn powder electrodes were composed of 60 wt. % active material (Sn), 30 wt. % carbon black and 10 wt. % binder. The KF polymer was added to a pre-weighed Thinky cup and diluted by the addition of 1-methyl-2-pyrrolidone (NMP) purchased from Sigma-Aldrich, and subsequently mixed for 3 minutes in a Planetary Centrifugal Mixer (Thinky USA, Inc.). The necessary amount of carbon black was then added to the Thinky cup and mixed for another 3 minutes. The active material was then added to the Thinky cup mixture containing KF polymer and carbon black and mixed for an additional 5 minutes. The powder slurry was coated onto 25 µm thick copper (Cu) foil (Alfa Aesar) using a doctor blade (100 µm film thickness). The coated active material was dried under vacuum at 80° C. for 24 hours and stored in an argon (Ar) filled glove box, prior to use. Final film thickness was pressed to 70 µm via a press roller.

Analytical characterization (XRD, SEM and TEM):

As-fabricated Sn, magnesiated Sn and de-magnesiated $Mg_2Sn$ films were characterized via X-ray diffraction (XRD) to determine crystallinity and the absence of any impurity phases. All XRD characterization was carried out on a Rigaku Smartlab diffractometer by scanning between 20 and 50, 2-Theta degrees at a rate of 1 degree per minute using Cu Kα 1.54 radiation. Sn and $Mg_2Sn$ films were referenced to PDF: 00-004-0673 and PDF: 00-006-0190 in the ICDD database, respectively. XRD analysis was also carried out on the as-fabricated and magnesiated $Mo_6S_8$ to ensure successful magnesiation. Evidence for the magnesiation was found in the peak shift observed for the spectra from as-fabricated to magnesiated state. The $Mo_6S_8$ and magnesiated-$Mo_6S_8$ spectra were referenced to PDF: 04-008-2607 and PDF: 04-013-5406 in the ICDD database, respectively.

Field emission scanning electron microscopy (SEM) and energy dispersive X-ray spectroscopy (EDX) were utilized to characterize the morphology, homogeneity and composition of the as-fabricated Sn films. A FBI Nova NanoSEM 200 outfitted with an Oxford EDX system, was operated at 5-20 kV, using a spot size of 3-5 and a working distance of 4-5 mm. Specific analysis related to the morphological and compositional differences between the as-fabricated, magnesiated Sn and de-magnesiated $Mg_2Sn$ films was carried out via transmission electron microscopy (TEM)-EDX. A Philips CM-100 TEM operated at 100 kV, outfitted with an Oxford EDX system and a JEOL 2010 TEM operated at 200 kV, outfitted with an EDAX EDX system, were utilized for all studies. TEM samples were prepared within an Ar filled glove box to avoid exposure to air.

Electrochemical Cycling of Anodes:

Initial galvanostatic magnesiation (defined as insertion of $Mg^{2+}$)/de-magnesiation (defined as extraction of $Mg^{2+}$) experiments were carried out on the as-fabricated Sn anodes to test their feasibility as insertion-type anodes, and their rate capability. Sn electrodes were tested by cutting out 15 mm diameter (1.77 $cm^2$ area) electrodes from the fabricated Sn powder/Cu foil assembly (as explained in 1). The active material loading content was 0.95 mg $cm^{-2}$. Each electrode was tested in a Tomcell (TJ-AC Tomcell Japan[2]) using a 250 µm thick (28 mm diameter) standard glass filter (Sigma-Aldrich) as a separator and 100 µm thick (19 mm diameter) polished magnesium (Mg) foil (ESPI Metals) as the counter electrode. Mg foil was polished by scraping each side of the foil with a standard microscope glass slide and wiping clean with a Kimwipe (Kimberly-Clark) within an Ar filled glove box. The electrolyte (350 µL per cell) used for these tests was 2 mL ethylmagnesium chloride (Sigma-Aldrich), 1 mL diethylaluminum chloride (Sigma-Aldrich) added to 13 mL anhydrous tetrahydrofuran (THF) (Sigma-Aldrich); (EtEt2). All Sn electrodes were cycled at various C-rates (0.002 C to 0.05 C) at 25° C. and compared to the performance obtained from cycling bismuth (Bi) anodes (80% active material, 10% carbon black, 10% binder). Bi anode pressed powder films were prepared using the same procedure as Sn anodes in (i). Bi powder was purchased from Sigma-Aldrich and used as-received. The active material loading content was 3.16 mg cm$^{-2}$. All cells were assembled in an Ar filled glove box to prevent exposure to air.

Full-Cell Experiments Using $Mo_6S_8$:

Chevrel Phase ($Mo_6S_8$) cathodes were fabricated following previously published work. Galvanostatic magnesiation/de-magnesiation of $Mo_6S_8$ experiments were run using a pre-magnesiated Sn ($Mg_2Sn$) anode and were carried out in both EtEt2 (organohaloaluminate) electrolyte (350 μl per cell) and conventional electrolyte (350 μl per cell)—0.5 M magnesium bis(trifluoromethanesulfonyl)imide—$Mg(N(SO_2CF_3)_2)_2$ in 1,2-Dimethoxyethane (DME) (Sigma-Aldrich) in a Tomcell. $Mg(N(SO_2CF_3)_2)_2$ was purchased from Kishida Chemicals Co., Ltd. and used as-received (no drying procedure was utilized for this salt). All Sn anodes were chemically pre-magnesiated using the EtEt2 electrolyte by soaking the Sn pressed powder film with Mg foil (sandwiched together) for 72 hours at 25° C. in an Ar filled glove box, prior to the full-cell experiments. Magnesiated anodes were thoroughly rinsed in THF prior to use and dried in a vacuum oven at 25° C. for 1 hour, to remove excess surface bound electrolyte. The cathode active material loading content was 1.13 mg cm$^{-2}$ and the anode active material loading content was 14.12 mg cm$^{-2}$ for both cells.

Parameters for DFT Calculations:

DFT calculations were performed with the Vienna Ab Initio Simulation Package (VASP) using projector augmented wave (PAW) pseudopotentials and exchange-correlation functionals parameterized by Perdew, Burke, and Ernzerhof for the generalized gradient approximation (GGA). All ions were fully relaxed, as were the shape and the volume of the supercell. A numerical convergence to 2 meV per atom was ensured by using a cutoff energy of 400.0 eV and an appropriate Gamma centered k-point mesh.

Potentiostatic Magnesiation of $Mo_6S_8$:

In order to demonstrate that the full capacity of a Sn anode could be utilized in a Mg-ion battery, two special $Mo_6S_8$/$Mg_2Sn$ full-cells were fabricated. Due to the unavailability of a suitable high capacity cathode, the loading level of $Mo_6S_8$ was increased in these cells (in comparison to those above) so its overall theoretical capacity would equal that of Sn (theoretical capacity of $Mo_6S_8$ is 128.8 mAh g$^{-1}$ and theoretical capacity for Sn is 903.04 mAh g$^{-1}$). The cathode active material loading content was 6.66 mg cm$^{-2}$ and the anode active material loading content was 0.95 mg cm$^{-2}$ for both cells. This full-cell configuration allows one to completely extract the $Mg^{2+}$ from a $Mg_2Sn$ anode and insert it into the $Mo_6S_8$ cathode. Due to the extremely slow C-rates at which the $Mg_2Sn$ anode de-magnesiates, a potentiostatic approach was utilized for these cells rather than the traditional galvanostatic approach. The application of +0.1 V for the duration of 72 hours would provide sufficient overpotential to execute the de-magnesiation of $Mg_2Sn$ and the simultaneous magnesiation of $Mo_6S_8$. Both de-magnesiated $Mg_2Sn$ and magnesiated $Mo_6S_8$ were characterized via XRD by scanning between 20 and 50, 2-Theta degrees at a rate of 0.1 degree per minute using Cu Kα 1.54 radiation.

The experimental result for the electrochemical voltage of formation of $Mg_2Sn$ concurs with theoretical DFT calculations. The de-magnesiation (defined as extraction of $Mg^{2+}$) plateau is observed at +0.20 V and corresponds to the extraction of $Mg^{2+}$ from $Mg_2Sn$. An interesting feature to note in FIG. 1 is the low hysteresis between the magnesiation and de-magnesiation curves for the Sn anode. The voltage required to extract $Mg^{2+}$ from $Mg_2Sn$ is only 50 mV more positive than the voltage needed to insert $Mg^{2+}$ into Sn. Further, the experimental capacity for the formation of $Mg_2Sn$ corresponds closely to the theoretical capacity that can be obtained using a Sn anode (903 mAh g$^{-1}$). In comparison, the magnesiation plateau observed at +0.23 V corresponds to the formation of $Mg_3Bi_2$. The de-magnesiation plateau is observed at +0.32 V and corresponds to the extraction of $Mg^{2+}$ from $Mg_3Bi_2$. The hysteresis between the magnesiation and de-magnesiation curves for the Bi anode in FIG. 2 is much larger (90 mV) than the Sn anode.

FIG. 2-inset shows the XRD spectra for the (1) as-fabricated Sn, (2) magnesiated Sn and (3) de-magnesiated $Mg_2Sn$ anode discussed above. The as-fabricated Sn film was crystalline and indexed to the tetragonal phase. SEM analysis of the as-fabricated Sn film showed a uniform distribution of Sn particles throughout the sample. Upon magnesiation, crystalline peaks associated with the formation of $Mg_2Sn$ were observed along with remnant Sn peaks with negligible intensities. No metallic Mg was observed in the $Mg_2Sn$ spectra. The de-magnesiated $Mg_2Sn$ film displayed the re-formation of the crystalline Sn phase along with remnant $Mg_2Sn$ peaks with negligible intensities. TEM and TEM-EDX analysis were also carried out on the as-fabricated Sn, magnesiated Sn and de-magnesiated $Mg_2Sn$ anodes to further explain the data in FIG. 2.

It is interesting to note that the Sn magnesiation/de-magnesiation curves in FIG. 2 show a very poor coulombic efficiency. Here, the de-magnesiation curve clearly shows that most of the $Mg^{2+}$ is not extracted from $Mg_2Sn$. It is of further interest to note that the XRD data in FIG. 2-inset contradicts this observation by displaying the lack of $Mg_2Sn$ peaks in spectra (3). However, the TEM-EDX data collected for this demagnesiated $Mg_2Sn$ sample, clearly shows the presence of Mg as shown in FIG. 7. A potential mechanism for the low efficiency includes that after a severe volume expansion (c.a. 214%) during Sn magnesiation, the $Mg_2Sn$ undergoes pulverization and subsequent amorphorization during the de-magnesiation process. As a result, the XRD analysis is unable to identify the amorphous $Mg_2Sn$ phase, which is only observed during the TEM-EDX analysis.

Figure 3:
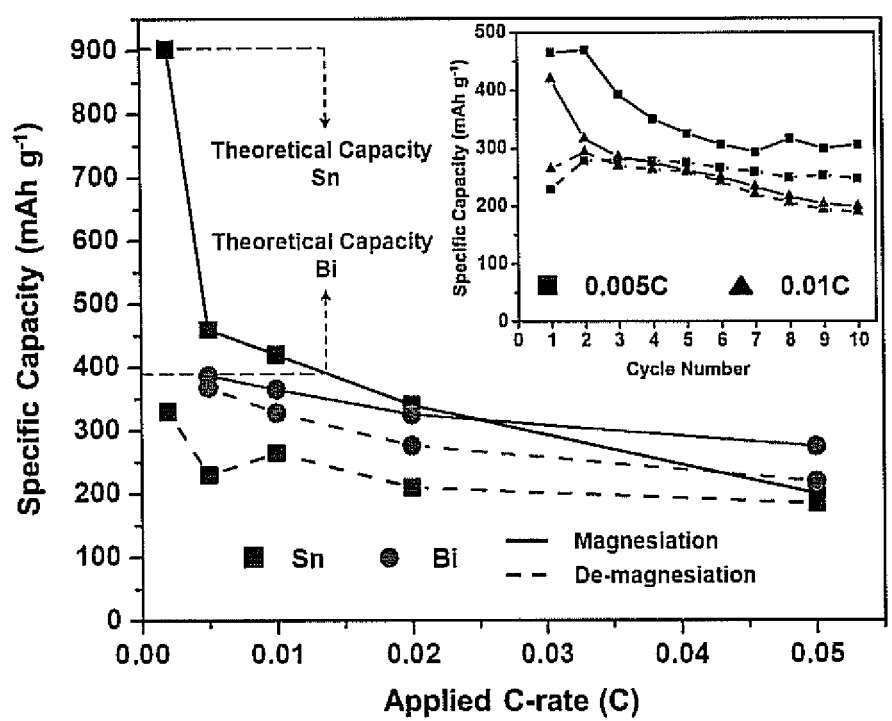
FIG. 3 is a diagram of Magnesiationlde-magnesiation capacities for Sn/Mg (■ black) and Bi/Mg (● red) half-cells at various C-rates. All half-cells were tested using organohaloaluminate electrolyte. Inset—10 cycles of a Sn/Mg half-cell at 0.005 C (■ black) and 0.01 C (▲ blue) rates in the same electrolyte.
Figure 4:
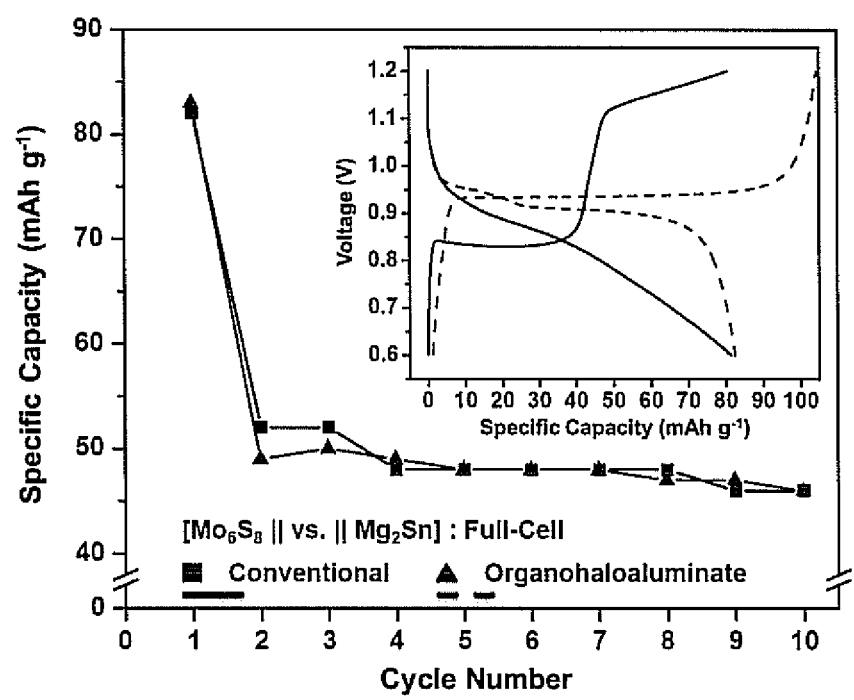
FIG. 4 is a plot of the first 10 cycles for a [$Mo_6S_8$/Conventional Electrolyte/$Mg_2Sn$] full-cell (■ black) and a [$Mo_6S_8$/Organohaloaluminate Electrolyte/$Mg_2Sn$] full-cell (▲ blue); Inset—$1^{st}$ cycle voltage profiles for each full-cell.

The rate capability of Sn and Bi anodes was also tested in an organohaloaluminate electrolyte by varying the galvanostatic cycling rates between 0.002 C and 0.05 C FIG. 3 shows a comparison of the 1$^{st}$ cycle galvanostatic half-cell magnesiation and de-magnesiation capacities obtained for Sn and Bi anodes at the various C-rates. Fresh cells were used to investigate each C-rate. The Sn anodes displayed dramatic decreases in both magnesiation and de-magnesiation capacities at higher C-rates. While it is evident that the Sn anodes suffer from poor kinetics (limiting their capacities at faster C-rates), it is also important to note that at faster C-rates, the hysteresis between the magnesiation and de-magnesiation capacities diminishes. Further, the Sn anode displays decent cycling characteristics when cycled past the first cycle at various C-rates as best seen in FIG. 3-inset. Unlike Sn, Bi displayed acceptable magnesiation/de-magnesiation capacities and hysteresis at the same C-rates. In order to highlight the compatibility and performance of a Sn anode in conventional battery electrolytes, a pre-magnesiated Sn ($Mg_2Sn$) anode and a Chevrel Phase ($Mo_6S_8$) cathode were coupled with 0.5 M $Mg(N(SO_2CF_{3})_2)_2$ in DME, as a full-cell. The experiment was repeated with an organohaloaluminate electrolyte, so as to compare the performance of the two cells. FIG. 4, shows the first 10 cycles of both cells with 1$^{st}$ cycle capacities of 82 mAh g$^{-1}$ (using a conventional electrolyte) and 83 mAh g$^{-1}$ (using an organohaloaluminate electrolyte), followed by a drop in capacities from the second cycle. The 1$^{st}$ cycle magnesiation/de-magnesiation of $Mo_6S_8$ curves are shown in FIG. 4 for both cells. While the voltage plateaus for the insertion/extraction of $Mg^{2+}$ in $Mo_6S_8$ vary for the two full-cells, and a distinct overcharge capacity for the cell cycled using the organohaloaluminate electrolyte is observed, the performance of both cells during these 10 cycles was found to be comparable. The voltage profiles for $Mg^{2+}$ insertion/extraction remain predictably lower than those previously reported for a $Mo_6S_8$/Mg metal full-cell, due to the use of the insertion-type Sn anode.

Figure 5:
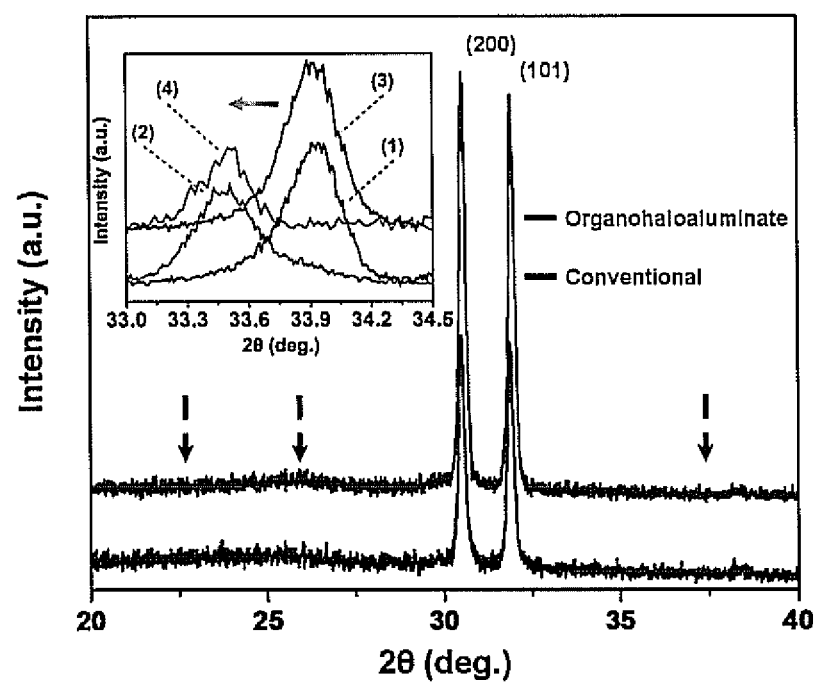
FIG. 5 is a plot of XRD spectra for de-magnesiated $Mg_2Sn$ from organohaloaluminate (blue) and conventional (black) electrolytes ($Mg_2Sn$ peak positions marked with arrows). Inset—XRD spectra showing a peak shift due to magnesiation (red) of $Mo_6S_8$ (black) in organohaloaluminate (peak shift 1→2) and conventional (peak shift 3→4) electrolytes.

Since the capacity observed in FIG. 4 was limited by the weight of the cathode active material, two additional $Mo_6S_8$/$Mg_2Sn$ full-cells were fabricated using both previously used electrolytes (organohaloaluminate and conventional). Here, the loading content of $Mo_6S_8$ was increased so that its gravimetric capacity matched that of Sn. $Mg^{2+}$ was extracted from $Mg_2Sn$ and inserted into $Mo_6S_8$ via the application of +0.1 V for 72 hours. The XRD spectra shown in FIG. 5 provides evidence towards the complete magnesiation of $Mo_6S_8$ (inset), and complete de-magnesiation of $Mg_2Sn$, for both cells.

Sn powder films were used as simple, low cost electrodes to study using high energy-density insertion-type anode materials for a Mg-ion battery system. It was shown that a Sn anode could attain higher capacities (903 mAh g$^{-1}$) and lower $Mg^{2+}$ insertion/extraction voltages (+0.15/0.20 V) than Bi (384 mAh g$^{-1}$, +0.23/0.32 V). More importantly, we were able to highlight the necessary compatibility and cyclability of the higher energy-density Sn anode with conventional battery electrolytes. The use of Sn as an insertion-type anode allows for the evaluation of high voltage/capacity Mg-ion battery cathodes using conventional battery electrolytes.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, We claim:

1. A magnesium-ion battery comprising:
    an anode, including an active material;
    a cathode;
    an electrolyte situated between the anode and the cathode, the electrolyte including a magnesium compound,
    the active material including tin wherein magnesium ions are inserted during discharging forming $Mg_2Sn$ and extracted from the active material during charging forming Sn and wherein a magnesium content of the active material is less than 66.7 atomic %.

2. The magnesium-ion battery of claim 1, wherein the cathode includes a cathode active material which shows electrochemical reaction at more positive operating voltage than the anode.

3. The magnesium-ion battery of claim 2, wherein the cathode includes a cathode active material including a Chevrel Phase ($Mo_6S_8$).

4. The magnesium-ion battery of claim 1, wherein the electrolyte is selected from organohaloaluminate and conventional electrolytes selected from magnesium bis(trifluoromethanesulfonyl)imide (TFSI) in 1,2-Dimethoxyethane (DME), magnesium perchlorate ($ClO_4^-$) and magnesium hexafluorophosphate ($PF_6^-$).

5. The magnesium-ion battery of claim 4, wherein the anode includes a binder, an electrically conducting material, and the active material.

6. The magnesium-ion battery of claim 1, wherein the capacity is greater than 900 mAh g$^{-1}$.

7. The magnesium-ion battery of claim 1, wherein the $Mg^{2+}$ insertion/extraction voltages are less than +(0.20/0.30 V).

8. A magnesium-ion battery comprising:
    an anode, including an active material;
    a cathode;
    an electrolyte situated between the anode and the cathode, the active material including tin wherein magnesium ions are inserted during discharging forming $Mg_2Sn$ and extracted from the active material during charging forming Sn and wherein a magnesium content of the active material is less than 66.7 atomic %.

9. The magnesium-ion battery of claim 8, wherein the electrolytes are selected from magnesium bis(trifluoromethanesulfonyl)imide (TFSI) in 1,2-Dimethoxyethane (DME), magnesium perchlorate ($ClO_4-$) and magnesium hexafluorophosphate ($PF_6-$).

10. The magnesium-ion battery of claim 8, wherein the capacity is greater than 900 mAh g-1.

11. The magnesium-ion battery of claim. 8, wherein the $Mg^{2+}$ insertion/extraction voltages are less than +(0.20/0.30 V).

12. A magnesium-ion battery comprising:
    an anode, including an active material;
    a cathode;
    a conventional electrolyte of magnesium bis(trifluoromethanesulfonyl)imide in 1,2-Dimethoxyethane (DME) situated between the anode and the cathode, the active material including tin wherein magnesium ions are inserted during discharging forming $Mg_2Sn$ and extracted from the active material during charging forming Sn and wherein a magnesium content of the active material is less than 66.7 atomic %.

13. The magnesium-ion battery of claim 12, wherein the capacity is greater than 900 mAh g$^{-1}$.

14. The magnesium-ion battery of claim 12, wherein the $Mg^{2+}$ insertion/extraction voltages are less than +(0.20/0.30 V).

* * * * *